United States Patent Office 3,642,724
Patented Feb. 15, 1972

3,642,724
PROCESS OF MAKING UNSATURATED POLYESTERS OF LOW FLAMMABILITY AND PRODUCT OBTAINED THEREBY
Karl Schmidt, Wiesbaden, and Gerhard Boockmann, Hamburg, Germany, assignors to Dr. Beck & Co., A.G., Hamburg, Germany
No Drawing. Filed Aug. 7, 1969, Ser. No. 849,296
Claims priority, application Germany, Aug. 8, 1968,
P 17 95 094.6
Int. Cl. C08g 17/12, 17/133
U.S. Cl. 260—78.4 EP 12 Claims

ABSTRACT OF THE DISCLOSURE

Unsaturated polyesters containing tetrabromophthalic acid or -anhydride as a flammability-reducing element are made by reacting a dicarboxylic acid anhydride with an alkylene oxide in the presence of a polymerization initiator and an alkaline catalyst for the reaction, the reaction mass including an $\alpha,\beta$-unsaturated dicarboxylic acid or -anhydride together with tetrabromophthalic acid or -anhydride. The $\alpha,\beta$-unsaturated dicarboxylic acid and the tetrabromo acid may form all or part of the dicarboxylic acid anhydride component or all or part of the polymerization initiator. The amount of the tetrabromophthalic acid or -anhydride must be in excess of 5% by weight relative to the weight of the total composition.

The polyesters have an extremely low flammability, are of a clear color and can be made in the ordinary alloy steel apparatus without danger of decomposition or discoloration of the reaction products.

BACKGROUND OF THE INVENTION

Unsaturated polyesters which are obtained by copolymerization of acid anhydrides with epoxy compounds are known. It is also known to use in this type of reaction a polymerization initiator and chain stopper such as carboxylic acids, water or alcohols. The catalysts used in this reaction are basic materials such as for instance certain zinc salts.

It has also been proposed to use tetrabromophthalic acid or anhydride as one of the raw materials for the unsaturated polyester to lower the ignition point of the ester. However, these processes involve the difficulty that during condensation in the normal alloy steel apparatus a partial decomposition and discoloration of the reaction products occurred, although the reaction could be carried out in glass or enamel apparatus without these difficulties.

To permit processing in the alloy steel apparatus of conventional structure, various additives have been used; however, in that case, discoloration or cloudiness of the reaction product occurred.

It is therefore an object of the invention to provide for a process for making unsaturated polyesters containing tetrabromophthalic acid or -anhydride which avoids the shortcomings just described.

SUMMARY OF THE INVENTION

The process of the present invention comprises reacting at elevated temperature (a) a dicarboxylic acid anhydride with
(b) an alkylene oxide in the presence of
(c) a polymerization initiator, and
(d) an alkaline catalyst, the reaction mass including an $\alpha,\beta$-unsaturated dicarboxylic acid and further including tetrabromophthalic acid or -anhydride, the unsaturated acid and the tetrabromophthalic acid or anhydride being added so as to constitute at least part of the dicarboxylic acid or of the polymerization initiator, and the tetrabromophthalic acid or -anhydride being added in an amount above 5% by weight relative to the total composition.

The invention also embraces the products thus made.

DESCRIPTION OF THE PREFERRED EMBODIMENTS

The catalyst in the reaction of the invention is preferably a tertiary amine and most preferably a tertiary aliphatic amine.

It has also been found that the polyesters obtained have better properties if, in addition to the above-listed components, phosphoric acid, phosphorus acid or phosphonic acid or an ester of these acids are added to the reaction mass. These phosphorus compounds serve as corrosion protections and as additional flameproofing agents. If the free acids are used, no further polymerization initiator is necessary because they themselves have a polymerization initiating action.

The phosphorous compounds can be added right at the beginning of the reaction. If used in larger amounts, and in particular up to 10% of the reaction mixture (computed as phosphoric acid), they have an excellent effect in regard to improved flame protection.

The process of the invention is carried out by reacting the carboxylic acid anhydrides with alkylene oxides at temperatures between 30 and 140° C., preferably at 80 to 120° C. After completion of the reaction it is preferable to reheat the mass to a temperature of between 160 and 250° C., preferably between 180 and 200° C. This reheating should preferably be effected in a vacuum. By means of the reheating, reaction products are obtained which have improved properties with regard to the gelling time and curing and contain a lower amount of low-molecular components. However, if reheating is effected, a corrosion protective agent must be present.

The unsaturated copolymerizable groups of the ester may be introduced in the reaction mass by way of the carboxylic acid anhydrides or by way of the polymerization initiating compound. The tetrabromophthalic acid likewise may be introduced by way of the anhydride component or by way of the initiating compound. However, it is necessary to employ an amount of at least 5% of the total reaction mass in tetrabromo compound.

Apart from the tetrabromophthalic acid anhydride and anhydrides of $\alpha,\beta$-unsaturated dicarboxylic acids, the following are examples to illustrate the carboxylic acid anhydrides: phthalic acid anhydride, tetrahydrophthalic acid anhydride, hexahydrophthalic acid anhydride, tetrachlorophthalic acid anhydride, endomethylenetetrahydrophthalic acid anhydride, methyltetrahydrophthalic acid anhydride, naphthalene acid anhydride, glutaric acid anhydride, etc.

Examples of suitable alkylene oxides are the following: ethylene oxide, propylene oxide, butylene oxide, and the higher homologs as well as the various glycidyl ethers and glycidyl esters and furthermore simple aromatic or simple aliphatic substituted ethylene oxides.

As polymerization initiators or chain stoppers it is broadly possible to employ any material with active hydrogen atoms. Such materials are for instance alcohols, carboxylic acids, amines, phenols and water. However, when selecting a chain stopper, it is necessary that the compound have sufficient solubility in the reaction mass. Chain stoppers that are only of limited solubility or have a high melting point, such as terephthalic acid, are less suitable.

As already indicated, together with the above components, phosphoric acid, phosphorus acid or phosphonic acid or esters of these acids may be added as corrosion protective agents and for further cooperation in improving the flame protection.

The purpose of the polymerization initiators, apart from the use as starting compounds for the reaction, lies in their ability to control the molecular weight of the reaction products. The desirable molecular weights in case of the unsaturated polyesters are generally between 1000 and 3000. These molecular weights can be obtained by adding, to between 1000 and 3000 g. of reaction mass, about 1 mol of a chain stopper. If the mentioned phosphorus acids are employed, it is possible to obtain unsaturated polyesters which include both bromine and phosphorus and which have a sufficiently high ignition point without the necessity of adding further components which may have a synergistic effect for the flame protection. These polyesters are suited to form clear curing self-extinguishing shapes.

It is also possible to add the alkylene oxide in the form of an ester to the polyester molecule by reacting the phosphoric acid, etc., with the alkylene oxide.

The catalysts employed in connection with the invention should be basic materials. Examples are for instance the hydroxides, oxides and salts of weak acids of the elements of the first and second main group and also of the second side-group of the Periodic Table.

Preferred are organic bases, particularly the tertiary amines. Among these, the aliphatic tertiary amines are particularly preferred because their excellent catalytic action is desirable. Examples are for instance triethylamine and dimethylbenzylamine.

The use of inorganic bases frequently has the undesirable result that a clouding of the final product is produced which is very difficult to remove. This takes place particularly when a corrosion-protection agent such as a phosphorus compound is included in the mixture.

The amount of catalyst may be between 0.1% and 5% and preferably is between 0.1% and 1%. Tertiary aromatic amines such as dimethylaniline and aromatic, nitrogen-based basic materials such as pyridine, should be used only in small amounts up to 0.3%, since larger amounts again result in a strong discoloration. The use of aromatic tertiary amines such as dimethylaniline as catalyst, or of primary or secondary aromatic amines such as aniline as chain stopper, results in a pre-accelerated unsaturated polyester resin which cures rapidly in the cold with diacyl peroxides.

The process of making the unsaturated polyesters of the invention is normally practiced in the manner that all of the raw materials that are required in the reaction are reacted in one stage. However, it is also possible to operate in several stages in order to obtain a better control of the chain lengthening. For instance chain stoppers which are effective also as polymerization initiators may first be added and ther may then alternately be added batches of alkylene oxides and anhydrides.

However, it is also possible first to add the chain stoppers and acid anhydrides and to add the alkylene oxides thereafter in stages or in a continuous manner.

The catalyst likewise can be added either continuously or in stages or right at the beginning of the reaction. It has been found that it is possible to obtain unsaturated polyester resins with a particularly low content of ether groups if all of the raw materials are premixed in the cold. The thus-formed unsaturated polyesters have an improved resistance against thermal degradation. This furthermore permits employing a smaller amount of the rather expensive alkylene oxides and still obtaining a sufficiently low acid number.

It is preferred to employ the alkylene oxides in an amount equivalent to that of the acid anhydrides and chain stoppers up to obtaining a constant acid number and then adding additional alkylene oxide in an amount dependent upon the final acid number, and thus to lower the acid number in the second stage of the procedure.

The polyesters of the invention may have an acid number between 0.01 and about 50. Preferably, the acid number is between 1 and 10.

These unsaturated polyesters of the invention have been found to be of particular usefulness in the making of electrical insulating materials.

If only tetrabromophthalic acid anhydride and maleic acid anhydride are used as the carboxylic acid anhydrides, it has been found that at acids numbers above 50 non-reacted tetrabromophthalic acid anhydride may precipitate from the reaction mass. It is therefore advisable to remain within the above range of acid numbers.

The reaction, as already indicated, is preferably carried out at a temperature between 30 and 140° C. The reaction mass is preferably heated, under pressure if desired, up to a temperature where an exothermic reaction is observed and the reaction mass is then maintained by cooling at a specific temperature, or a slight further increase of the temperature to, for instance, 120° C. is permitted by slightly reducing the cooling effect.

The reaction is then permitted to proceed up to a maximum temperature of about 140° until the acid number no longer changes substantially (more than one point within one hour). If the resulting acid number turns out to be too high, additional alkylene oxide is added and the reaction is continued.

The final unsaturated polyester can be further processed in the conventional manner, for instance by dissolving it in unsaturated copolymerizable monomers.

A reheating is necessary if products are desired which should have a particularly rapid curing property. Reheating, preferably under vacuum, is desirable also in order to create a predetermined melt viscosity or a desired solution viscosity.

If a reheating is effected, it is necessary, as already indicated, that a corrosion protective agent be present. This agent may be in the form of phosphoric acid, phosphorus acid or phosphonic acid or an ester of these acids which act as chain stoppers and may be added right at the commencement of the reaction. They may also be added during the reaction of the alkylene oxides with the acid anhydrides or after completion of the reaction.

If the free phosphorus acids are added after completion of the reaction, a minor decomposition will occur during the thermic after-treatment of the bromophthalic acid esters upon splitting off of low molecular components. It is therefore preferred, if the free phosphorus acids are used to employ them during the reaction between the acid anhydrides and alkylene oxides so as to act as chain stoppers and permitting them to react with the alkylene oxide so as to form esters.

If phosphorus acids are added as corrosion-protection agents, it is not necessary to use them in an amount larger than equivalent to the amount of the catalyst.

The reheating, as indicated, is preferably effected at a temperature between 160 and 250° C. and most preferably between 180 and 200° C. The exact time of the reheating treatment depends on the desired reactivity of the unsaturated polyester, on its viscosity and on the temperature chosen. If a free phosphorus acid is added as corrosion-protection agent after completion of the reaction between the alkylene oxide and acid anhydride and prior to the reheating, it is necessary to restrict the temperature of the reheating treatment and the time in order to eliminate the possibility of decomposition or reduce the same. It is therefore preferable to avoid these difficulties by using phosphorus acid esters as corrosion-protection agents which may be done either by adding these esters as such or by permitting them to form in situ.

It is surprising that the unsaturated tetrabromophthalic based polyesters made by the process of the invention could be condensed in the normal alloy steel apparatus. These polyesters of the invention can be dissolved in copolymerizable monomers and then be used as self-extinguishing or difficultly flammable masses in casting and impregnating operations. They can however also be mixed with conventional unsaturated polyesters, provided that they contain a sufficiently high amount of tetrabromophthalic acid esters. In the latter case, they can be used as additives which raise the ignition point in the conventional unsaturated polyester resins.

The polyester resins of the invention are particularly useful as such additives since, in order to obtain low flammability in conventional unsaturated polyesters, only an amount of about between 4 and 5 wt. percent of bromine is required with the simultaneous presence of between 5 and 15% of antimony trioxide. The process of the invention permits to make unsaturated polyesters having a bromine content in excess of 40%.

Unsaturated polyesters of the invention can furthermore be used to make non-dripping polyurethane of low flammability.

The following examples will further illustrate the invention.

EXAMPLES 1-9

In all of these examples the following general composition of the reaction mass was employed:

| | Kg. |
|---|---|
| Tetrabromophthalic acid anhydride | 46.4 |
| Maleic acid anhydride | 9.8 |
| Butylene oxide | 14.4 |
| Neopentylglycol | 3.0 |

To this mass the following catalysts in the stated amounts were added:

| Example: | | Kg. |
|---|---|---|
| 1. | Triethylamine | 0.07 |
| 2. | Triethylamine | 0.20 |
| 3. | LiOH·H$_2$O | 0.20 |
| 4. | KOH | 0.20 |
| 5. | Pyridine | 0.07 |
| 6. | Dimethylbenzylamine | 0.07 |
| 7. | Dimethylaniline | 0.20 |
| 8. | Dimethylbenzylamine | 0.20 |
|    | Phosphoric acid (85% conc.) | 0.1 |
| 9. | Dimethylbenzylamine | 0.07 |
|    | Triethylphosphate | 0.1 |

These components were placed in a 100-liter V2A (alloy steel) condensation apparatus provided with a heater, stirrer, reflux condenser, condenser and receptacle for the condensate. While stirring, the mass was heated to reflux temperature, that is about 70° C. The heating was then terminated and the temperature adjusted by cooling so that a minor distillation backflow was maintained. The temperature in this process went up to 120° C. At 120° C., the necessary amount of butylene oxide was added, determined by the theoretical amount required for the particular acid number until an acid number of smaller than 5 was obtained. After each batch of addition of butylene oxide, the reaction was permitted to proceed for 1 hour at 120° C.

The following table shows the time expired, from reaching the boiling point up to reaching an acid number smaller than 5, as well as the required amount of butylene oxide.

TABLE I

| Example | Reaction time, hrs. | Butylene oxide | Color | Gel time,[1] min. |
|---|---|---|---|---|
| 1 | 8 | 17.0 | Bright yellow, clear | 95 |
| 2 | 5 | 15.4 | Bright yellow-brown clear | 104 |
| 3 | 9 | 19.0 | Bright yellow, slightly turbid | 93 |
| 4 | 10 | 19.2 | Brown, slightly turbid | 95 |
| 5 | 6 | 16.3 | Bright brown, clear | 112 |
| 6 | 8 | 15.2 | Slightly brighter than 1 clear | 90 |
| 7 | 10 | 17.0 | Bright yellow-brown, clear | 82 |
| 8 | 9 | 15.8 | Same as 6 | 88 |
| 9 | 8 | 15.2 | do | 90 |

[1] The gel time was determined with 30% styrene, 2% methylethylketoneperoxide dissolved at a 50% concentration in dimethylphthalate and 2% of a 7%-concentration solution of cobalt octoate in styrene at a temperature of 25° C.

NOTE.—The absorbed amount of butylene oxide indicates the ether contents.

As the examples show, the tertiary amine, and particularly the tertiary aliphatic amines, are of advantage because of the reaction time, the color and the absorption of butylene oxide. A comparison between Examples 8 and 9 shows that small amounts of phosphoric acid increase the requirement of butylene oxide, while the phosphoric acid ester remains inert.

EXAMPLES 10, 11, 12

The reaction masses used above in Examples 6, 8 and 9 were subjected to a reheating to 200° C. and were maintained at this temperature for 2 hours. The following table shows the results:

TABLE II

| Example | Composition as in Example— | Color | Acid Number | Gel time, min. |
|---|---|---|---|---|
| 10 | 6 | Dark brown | 28 | 46 |
| 11 | 8 | Bright yellow | 6 | 13 |
| 12 | 9 | do | 9 | 10 |

EXAMPLE 13

The reaction mass employed above in Example 6 was reacted with 0.1 g. of triethylphosphate after an acid number of 5 had been reached and was subjected to heating to 200° C. Subsequently, a vacuum was employed and condensation was effected at 200° C. and 20 torr pressure until a viscosity of 2:1 in styrene amounting to 600 cp. was obtained. This took about 4 hours. The color of the polyester obtained was bright yellow-brown. The gel time was 8 minutes and the acid number 11.

EXAMPLE 14

The same mass as used in Example 8 was reheated to 200° C. Subsequently, a vacuum was applied and condensation was effected at 200° C. and a pressure of 20 torr until a viscosity (2:1) in styrene of 600 cp. had been obtained. This took about 4 hours. The color of the polyester thus resulting was bright yellow-brown. The gel time was 10 minutes and the acid number 15.

EXAMPLE 15

In this example the following components were used:

| | G. |
|---|---|
| Tetrabromophthalic acid anhydride | 928 |
| Maleic acid anhydride | 196 |
| Butylene oxide | 288 |
| Fumaric acid | 60 |
| Dimethylbenzylamine | 14 |
| Triethylphosphate | 15 |

These components were placed in a 2-liter glass apparatus equipped with a stirrer, thermometer, reflux condenser and heater until slow reflux distillation took place (at 68° C.). The reaction was continued for six hours while a small amount of reflux occurred. The temperature at the end had risen to 120° C. After then adding a further 80 grams of butylene oxide at this temperature, an acid number of 4 was obtained. The reaction was then continued for 2 hours at 200° C. The resulting resin was bright brown and clear and had a gell time at 8 minutes with the same treatment as in the examples above stated.

We claim:

1. The process of making an unsaturated polyester of low flammability comprising reacting in a stainless steel vessel at a temperature of about 30–140° C. (a) a dicarboxylic acid anhydride with (b) an alkylene oxide in the presence of (c) a polymerization initiator and (d) a tertiary amine as catalyst, the reaction mass including (e) an $\alpha,\beta$-unsaturated dicarboxylic acid and further including (f) tetrabromophthalic acid or -anhydride, (g) phosphoric acid, phosphorous acid or phosphonic acid, or an ester of these acids, the components (e) and (f) being added so as to constitute at least part of the dicarboxylic acid (a) or of the polymerization initiator (c) and the tetrabromophthalic acid or -anhydride being added in an amount above 5% by weight relative to the total composition and thereafter heating the reaction mass after completion of the reaction between the dicarboxylic acid anhydride and the alkylene oxide to a temperature between 160 and 250° C.

2. The process of claim 1, wherein free phosphoric acid, phosphorous acid or phosphonic acid is used and the free acid constituting the entire polymerization initiator.

3. The process of claim 1, wherein the dicarboxylic acid comprises for a major part tetrabromophthalic acid and for a minor part maleic acid and wherein the alkylene oxide is butylene oxide.

4. The process of claim 1, wherein the dicarboxylic acid comprises for a major part tetrabromophthalic acid and for a minor part maleic and fumaric acid, the said unsaturated acids constituting all of the polymerization initiator.

5. The process of claim 1, wherein the polymerization initiator acts also as a chain stopper and is in a form soluble in the reaction mass at the temperatures of the reaction.

6. The process of claim 1, which is carried out at a temperature between 80 and 120° C.

7. The process of claim 1, wherein the reheating is effected at a temperature between 180 and 200° C.

8. The process of claim 1, wherein the amounts of the components are selected to obtain an acid number in the final product between 0.01 and 50.

9. The process of claim 1, wherein the components of the reaction are selected in amounts so as to obtain an acid number between 1 and 10.

10. The process of claim 1, wherein cold premix of the components of the reaction is prepared prior to effecting said reaction at elevated temperatures.

11. The process of claim 10, wherein part of the alkylene oxide is added in an amount equivalent to the amount of the dicarboxylic acid anhydride and of the polymerization initiator until a constant acid number is obtained, whereupon additional alkylene oxide is added in an amount to obtan the desired acid number.

12. An unsaturated polyester resin of low flammability containing tetrabromophthalic acid or -anhydride obtained by the process of claim 1.

References Cited
UNITED STATES PATENTS 3,254,060   5/1966   Connolly et al. _____ 260—78.4
3,483,169   12/1969  Case et al. _____ 260—78.4

JOSEPH L. SCHOFER, Primary Examiner

J. KIGHT III, Assistant Examiner

U.S. Cl. X.R.

260—860, 861